(No Model.)

C. GLOVER.
SHEET METAL KNOB.

No. 436,523. Patented Sept. 16, 1890.

Witnesses.
John Edwards Jr.
W. H. Whiting.

Inventor,
Charles Glover,
By James Shepard.
Atty.

UNITED STATES PATENT OFFICE.

CHARLES GLOVER, OF NEW BRITAIN, CONNECTICUT, ASSIGNOR TO P. & F. CORBIN, OF SAME PLACE.

SHEET-METAL KNOB.

SPECIFICATION forming part of Letters Patent No. 436,523, dated September 16, 1890.

Application filed October 14, 1889. Serial No. 326,995. (No model.)

*To all whom it may concern:*

Be it known that I, CHARLES GLOVER, a citizen of the United States, residing at New Britain, in the county of Hartford and State of Connecticut, have invented certain new and useful Improvements in Sheet-Metal Knobs, of which the following is a specification.

My invention relates to improvements in sheet-metal knobs; and the objects of my improvement are to simplify the construction, and thereby produce a knob at a small cost and at the same time one that shall be strong and durable and of a light weight.

Figure 1:
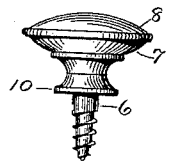
Figure 2:
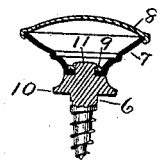
Figure 3:
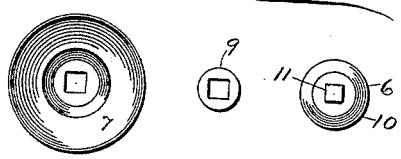
Figure 4:
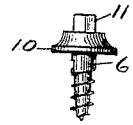

In the accompaning drawings, Figure 1 is a side elevation of my knob. Fig. 2 is a central section of the same, the lower end of the shank being shown in elevation. Fig. 3 is a plan view of three principal parts detached; and Fig. 4 is a side elevation of one of said parts—namely, the shank portion.

I make my knob of four pieces—the shank portion 6, the cup-shaped knob part 7, the knob-cap 8, and the washer 9. The projecting end of the shank portion may be in the form of a rivet or screw, the latter form being shown. I provide said shank portion with a knob-base 10, the same being the broadest at its under side and tapering upwardly to form about one-half of the knob's neck. At the upper end of this knob-base 10, I form a head 11, preferably square in cross-section; but other forms that will prevent said head from rotating within a hole of a corresponding shape may be substituted for the square form.
I form this shank portion of drawn wire in a heading-machine, so as to produce the projecting end, knob-base 10, and head 11 all in one single piece, as shown in Fig. 2. I form the cup-shaped knob part 7 of sheet metal struck up in dies and perforate its bottom with a hole corresponding in form to that of the head 11. This cup-shaped knob part 7 is placed upon the shank portion 6, the washer 9 placed upon the head of said shank portion within the bottom of the cup-shaped knob part, and the parts secured together by heading down or riveting the end of the head 11, as shown in Fig. 2. The lower end of the cup-shaped knob part 7 is of a size equal to that of the upper end of the knob-base 10, so that when the two are united they form the narrow neck of the knob, as shown. In case metal of considerable thickness is employed for the cup-shaped knob part 7 the washer 9 may be dispensed with; but by its use much thinner metal may be used for making the cup-shaped knob part 7. The cap 8 is also struck up from sheet metal, and it is secured to the knob part 7 by turning over its edges in the ordinary manner of uniting two such parts, the manner of securing the cap 8 not being peculiar to my invention.

My improvements relate to and reside in the other parts of the knob in connection with this ordinary cap.

I claim as my invention—

The herein-described knob, consisting of the shank portion having the integral knob-base 10 and the square head 11, and the cup-shaped knob part 7, having a hole in its bottom corresponding in form to the head of the shank portion, said parts being riveted together and covered with the ordinary cap, substantially as described, and for the purpose specified.

CHARLES GLOVER.

Witnesses:
CHARLES R. BARROWS,
AMOS C. FITZ.